Aug. 11, 1925.  
W. E. HEAL  
1,549,541  
METHOD OF AND APPARATUS FOR FORMING GLASS SHEETS  
Filed Aug. 22, 1924  3 Sheets-Sheet 2
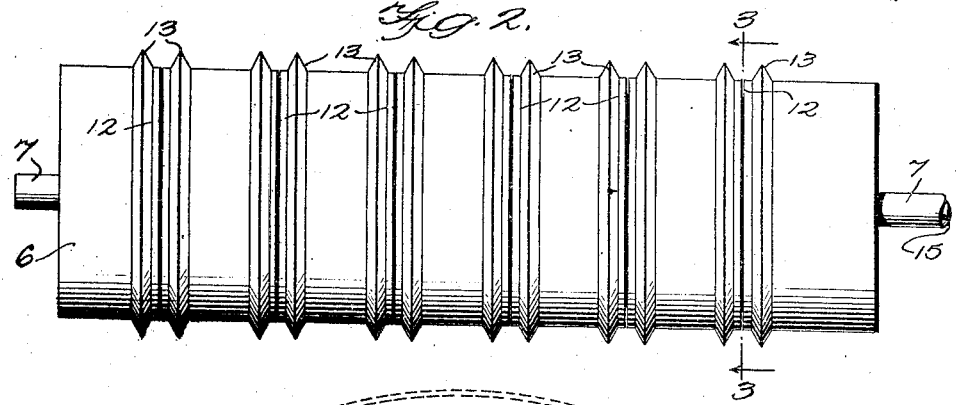
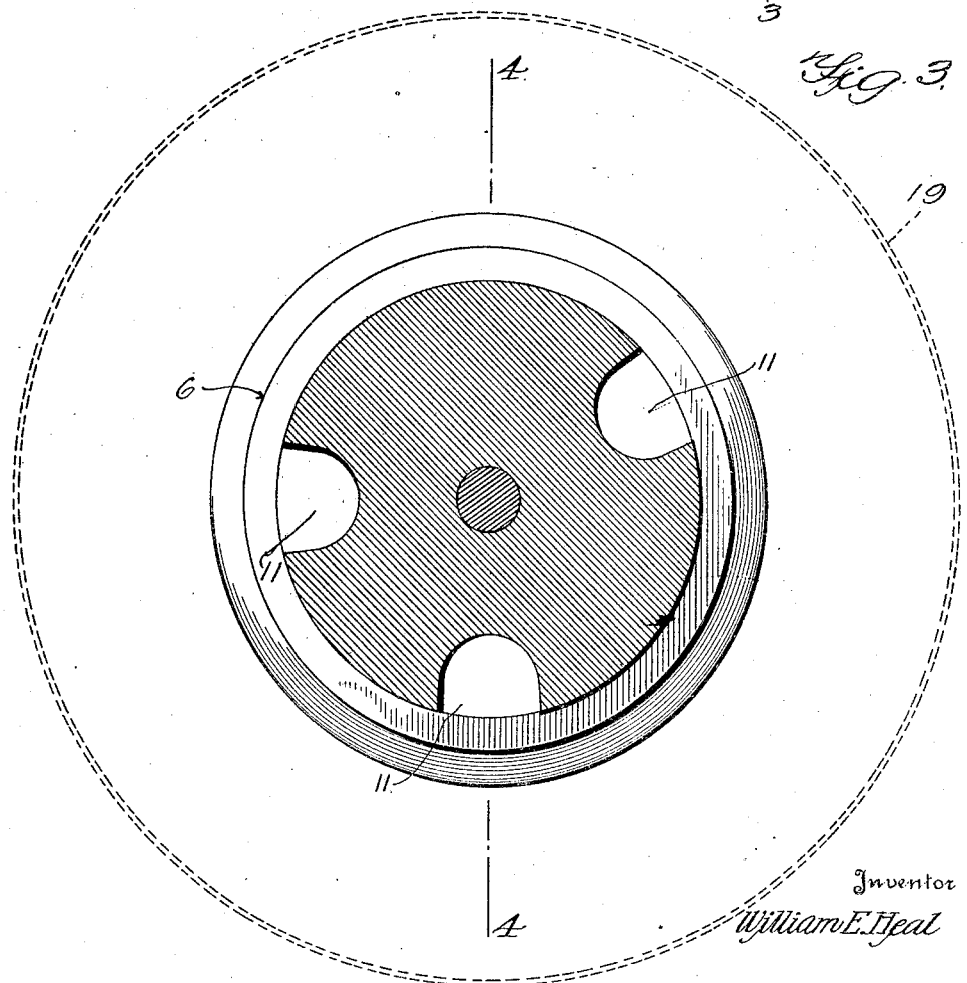
Inventor  
William E. Heal  
By  
Attorney Aug. 11, 1925.
W. E. HEAL
1,549,541
METHOD OF AND APPARATUS FOR FORMING GLASS SHEETS
Filed Aug. 22, 1924     3 Sheets-Sheet 3
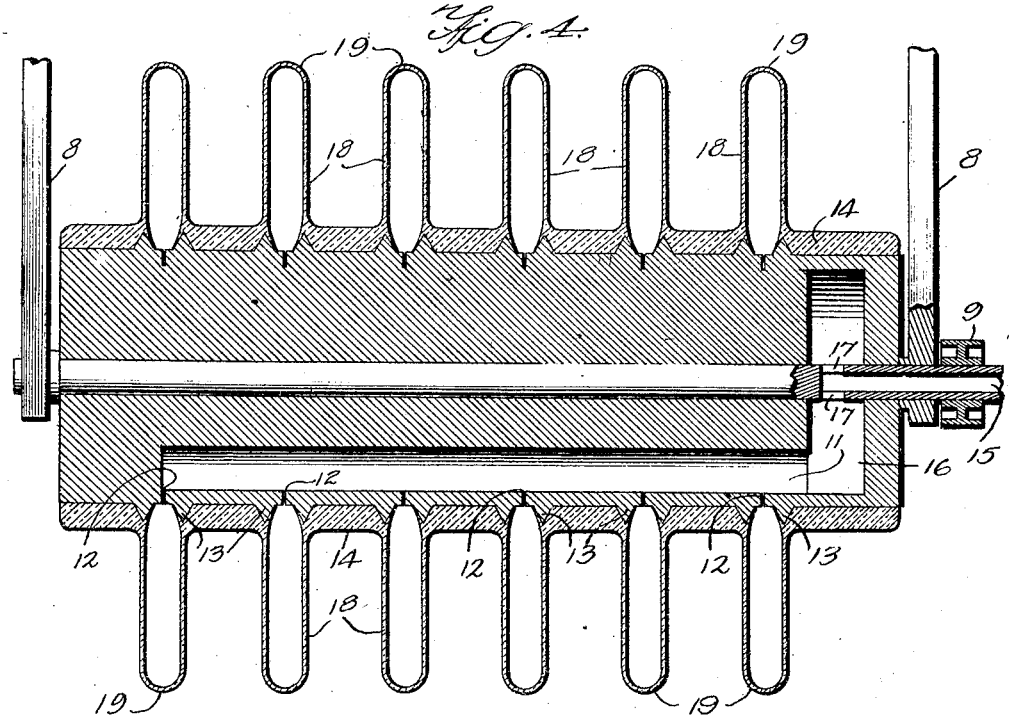
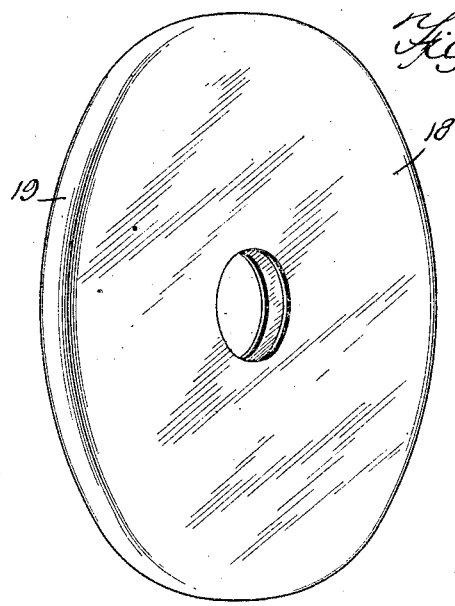
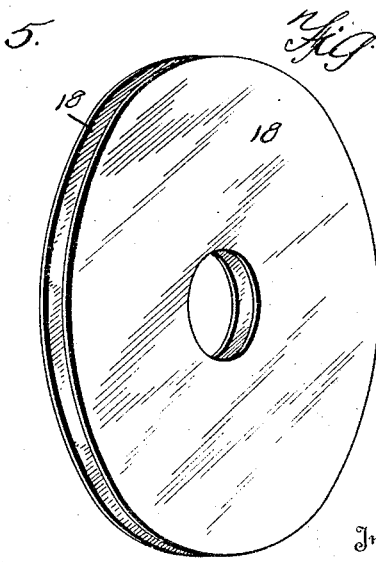
Inventor
William E. Heal,
By
Attorney Patented Aug. 11, 1925.

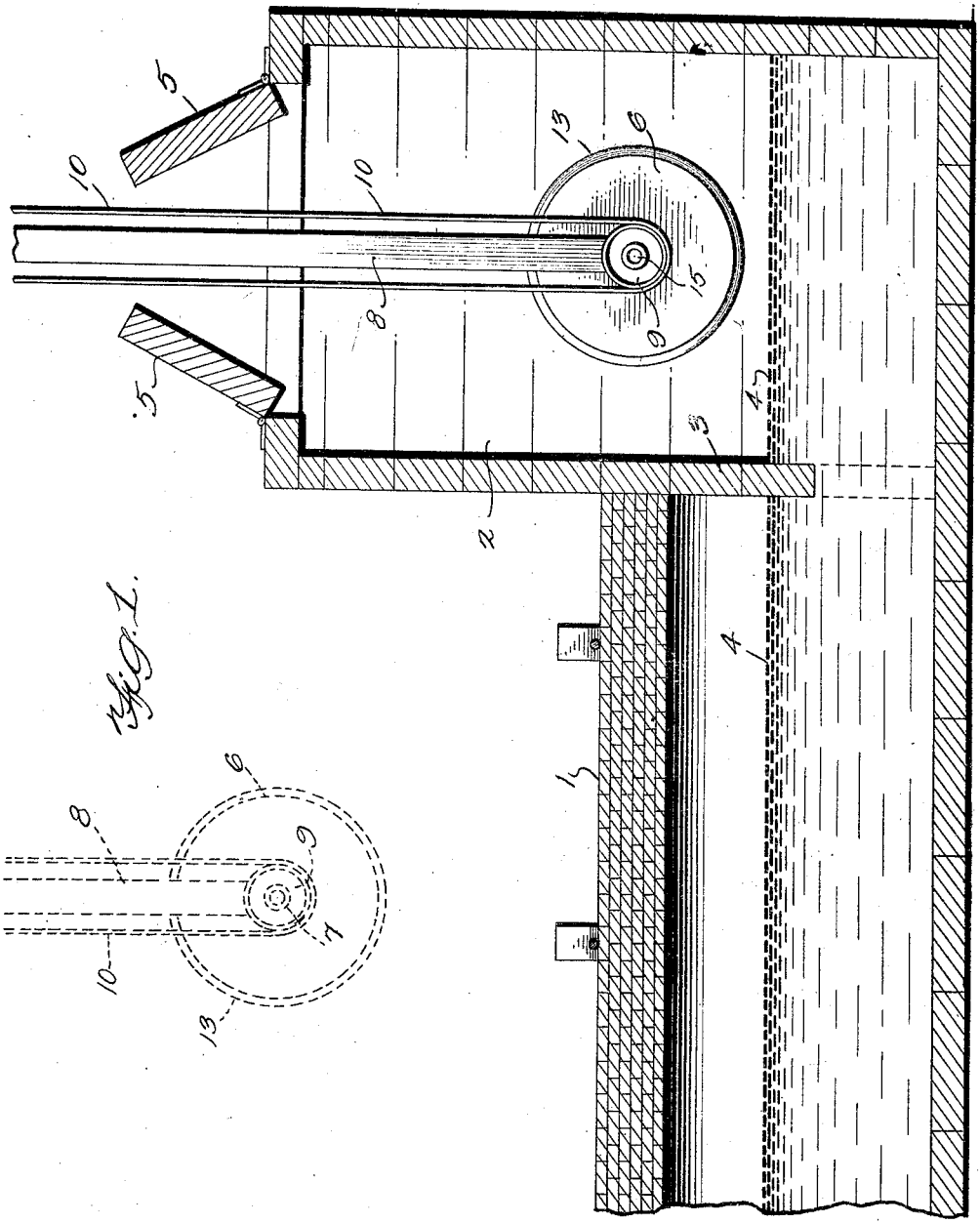

1,549,541

UNITED STATES PATENT OFFICE.

WILLIAM E. HEAL, OF WASHINGTON, DISTRICT OF COLUMBIA.

METHOD OF AND APPARATUS FOR FORMING GLASS SHEETS.

Application filed August 22, 1924. Serial No. 733,655.

*To all whom it may concern:*

Be it known that I, WILLIAM E. HEAL, a citizen of the United States, residing at Washington, in the District of Columbia, have invented certain new and useful Improvements in Methods of and Apparatus for Forming Glass Sheets, of which the following is a specification.

This invention relates to methods of and apparatus for forming glass sheets.

In the present method, I employ a gathering roll on which a layer of semi-fluid glass is arranged. The glass is blown outwardly by means of pressure introduced beneath its surface, the roll being revolved to cause the glass to flow outwardly by centrifugal force to form sheets.

The invention further comprises suitable apparatus consisting of a gathering roll having a plurality of passages parallel to its outer surface, and radial ports extending from these passages to the surface of the roll, whereby air or other fluid may be introduced beneath the surface of a layer of glass arranged on the surface of the roll.

An object of the invention is to provide means for forming a plurality of sheets of glass of uniform thickness and quality from the surface of a single gathering roll.

In the accompanying drawings, I have shown an organization of appartus elements particularly suitable for use in practicing the process and forming a part of the invention. In this showing:

Figure 1 is a longitudinal sectional view of a heating tank showing the gathering roll about to be submerged in the body of fluid glass, Figure 2 is a front elevation of the gathering roll, Figure 3 is a transverse sectional view on line 3—3 of Figure 2, Figure 4 is a central longitudinal sectional view on line 4—4 of Figure 3, Figure 5 is a perspective view of one of the finished glass units, and, Figure 6 is a similar view of a pair of sheets of glass formed therefrom.

Referring to the drawings, the reference numeral 1 designates a suitable heating chamber in which the glass is heated to a molten or fluid condition by any suitable heating means (not shown). An auxiliary chamber 2 is connected to the heating chamber. As shown, the auxiliary chamber is separated from the main chamber by a partition wall 3. This partition wall terminates above the bottom, permitting the glass to flow from the main chamber to the auxiliary chamber. The level of glass in the chamber is represented by the reference numeral 4. The auxiliary chamber is provided with doors 5 at the top, which may be closed when the gathering roll is removed from the chamber to conserve heat therein. The gathering roll consists of a cylindrical body 6, formed of fire-clay or other suitable material. The roll is mounted on a shaft 7, whereby it may be revolved. As shown, the shaft is mounted in suitable supporting members 8 to permit the roll to be lowered into the auxiliary chamber. The roll is lowered into the chamber until its lower portion is submerged in the body of glass and is revolved to obtain a layer of glass on its surface. It is then removed to the dotted line position shown in Figure 1 of the drawings. One end of the shaft is provided with a pulley 9, adapted to receive a belt 10, by means of which the roll and shaft may be revolved.

The roll is provided with a plurality of longitudinal passages 11. Any desired number of passages may be employed. The passages are connected to the periphery by means of radial ports 12. Adjacent each set of radial ports, the surface of the drum is provided with a pair of spaced projecting rings 13.

In Figure 4 of the drawings, I have shown a layer of glass 14 on the surface of the roll. As shown, one end of the shaft 7 is hollow, forming a fluid conduit 15. This conduit is connected to a suitable source of pressure (not shown). A manifold or chamber 16 is provided in the end of the cylinder and communicates with the conduit through passages 17, formed in the shaft. As shown, the passages 11 communicate with this manifold. The glass sheets are shown in this figure of the drawings, and consist of pairs of spaced plates or sheets 18 connected at their outer ends by a loop 19.

In practicing the process, the glass is first heated until it is in the proper condition and the gathering roll lowered into the auxiliary chamber 2. With the bottom of the roll submerged in the body of glass, the roll is revolved to form a sheet 14 of glass on its periphery. The roll is then withdrawn from the chamber and carried to a desired point, as indicated in dotted lines in Figure 1 of the drawings. Air or other fluid under pressure is then admitted to the manifold 16 through the conduit 15 and the passages 17. The roll is first revolved slowly and air is fed to its surface through the passages 11 and ports 12 to cause the glass to move outwardly between each pair of rings. The speed of the roll is then increased, causing the semi-fluid glass to move outwardly by centrifugal force to form sheets 18. Air is introduced through the passage 11 and port 12 during the formation of the sheets to prevent collapsing of the partially formed sheets. This produces circular sheets of glass of uniform diameter and thickness. The units of glass formed by this operation may be removed from the cylinder by cutting the glass in any suitable manner at the point where the sheets 18 are joined to the layer 14. One of the units is shown in Figure 5 of the drawings. The loop 19 may then be separated from the two sheets to produce the two sheets shown in Figure 6 of the drawings. As an alternative method, the two sheets may be separated while still on the roll by first removing the loop 19 and then each of the sheets 18 may be separately removed.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. The method of forming glass sheets which comprises placing a layer of semi-fluid glass on the periphery of a gathering roll and revolving the roll to feed the glass outwardly by centrifugal force and form a pair of spaced sheets.

2. The method of forming glass sheets which comprises placing a layer of semi-fluid glass on the periphery of a gathering roll, revolving the roll to feed the glass outwardly by centrifugal force and form a pair of spaced sheets, and introducing air between the sheets during their formation to prevent collapsing.

3. The method of forming sheets of glass which comprises placing a layer of semi-fluid glass upon the periphery of a gathering roll, separating the glass from the roll at spaced points by means of a fluid current introduced beneath the layer of glass, and revolving the roll to feed the glass outwardly at said points of separation and form a plurality of pairs of spaced sheets.

4. The method of forming sheets of glass which comprises placing a layer of semi-fluid glass upon the periphery of a gathering roll, separating the glass from the roll at spaced points by means of a fluid current introduced beneath the layer of glass, revolving the roll to feed the glass outwardly at said points of separation and form a plurality of pairs of spaced sheets, and introducing air between the sheets of each pair during their formation to prevent collapsing.

5. In a device of the character described, a gathering roll, means for delivering fluid to the surface of the roll at a plurality of spaced points, and means for revolving said roll.

6. In a device of the character described, a gathering roll having a plurality of spaced passages, and radial ports communicating with said passages.

7. In a device of the character described, a gathering roll having a plurality of longitudinal passages, and transverse ports communicating with said passages and extending through the periphery of the roll.

8. In a device of the character described, a gathering roll having a manifold formed in one end, means for introducing fluid into said manifold, a plurality of passages extending longitudinally of said roll and communicating with said manifold, said roll being provided with radial ports communicating with said passages and extending through the periphery of the roll.

In testimony whereof, I affix my signature.

WILLIAM E. HEAL.